(12) United States Patent
Trudeau

(10) Patent No.: US 7,105,123 B2
(45) Date of Patent: Sep. 12, 2006

(54) HEAT DISSIPATION DEVICE FOR AND METHOD OF DISSIPATING HEAT FROM A MANIFOLD

(75) Inventor: Robert Trudeau, Spartanburg, SC (US)

(73) Assignee: Mold-Masters Limited, Georgetown (CA)

(*) Notice: Subject to any disclaimer, the term of this patent is extended or adjusted under 35 U.S.C. 154(b) by 417 days.

(21) Appl. No.: 10/755,367

(22) Filed: Jan. 13, 2004

(65) Prior Publication Data

US 2004/0166195 A1    Aug. 26, 2004

Related U.S. Application Data

(60) Provisional application No. 60/452,497, filed on Mar. 7, 2003, provisional application No. 60/448,146, filed on Feb. 20, 2003.

(51) Int. Cl.
B29C 45/72 (2006.01)

(52) U.S. Cl. ............... 264/328.8; 264/328.14; 425/547; 425/572

(58) Field of Classification Search ................ 425/547, 425/572; 264/328.14, 328.8
See application file for complete search history.

(56) References Cited

U.S. PATENT DOCUMENTS 4,439,915 A    4/1984    Gellert
4,557,685 A   12/1985    Gellert
4,648,546 A    3/1987    Gellert
4,688,622 A    8/1987    Gellert
5,125,827 A    6/1992    Gellert
5,360,333 A   11/1994    Schmidt
5,411,392 A    5/1995    Von Buren
5,503,545 A *  4/1996    Benenati .................. 425/572
5,952,016 A *  9/1999    Gellert .................... 425/572
6,447,283 B1   9/2002    Gellert

FOREIGN PATENT DOCUMENTS

JP    2002-331552    11/2002
WO    WO 95/00312     1/1995
WO    WO 03/80315    10/2003

OTHER PUBLICATIONS

S.L. Folkman et al., "Characterization of electroless nickel plating on aluminum mirrors," Proceedings of SPIE, Optomechanical Design and Engineering 2002, vol. 4771, p. 254, Jul. 7-9, 2002.

E.A. Wachter et al., "Remote Optical Detection Using Microcantilevers," Rev. Sci. Instrum. vol. 67, No. 10, pp. 3434-3439 (Oct. 1996).

* cited by examiner

*Primary Examiner*—Tim Heitbrink
(74) *Attorney, Agent, or Firm*—Sterne, Kessler, Goldstein & Fox PLLC (57) ABSTRACT

An injection molding apparatus comprising a hot runner manifold, a heater coupled to the manifold and a heat dissipation device coupled to said manifold, wherein said heat dissipation device reduces hot spots on said manifold caused by uneven heating.

29 Claims, 5 Drawing Sheets

HEAT DISSIPATION DEVICE FOR AND METHOD OF DISSIPATING HEAT FROM A MANIFOLD

CROSS-REFERENCE TO RELATED APPLICATIONS

This application claims priority to U.S. provisional patent application No. 60/448,146, filed Feb. 20, 2003, and U.S. provisional patent application No. 60/452,497, filed Mar. 7, 2003.

FIELD OF THE INVENTION

The present invention relates generally to an injection molding apparatus and, in particular, to a heat dissipation device for and a method of dissipating heat from a manifold.

BACKGROUND OF THE INVENTION

As is well known in the art, hot runner injection molding systems include a manifold for conveying pressurized melt from an inlet to one or more manifold outlets. Each manifold outlet leads to a nozzle, which, in turn, extends to a gate of an injection mold cavity. Manifolds have various configurations, depending upon the number and arrangement of the nozzles and the corresponding injection mold cavities.

It is known to heat the manifold in order to maintain a desired temperature distribution throughout the manifold. Means of heating manifolds include integrally casting or brazing an electrical heating element into the manifold, as described in U.S. Pat. No. 4,688,622 to Gellert and U.S. Pat. No. 4,648,546 to Gellert, respectively. The heating element may also be mechanically joined to the manifold by pressing the element into the manifold to create an interference, friction or deformation fit. Alternatively, thermal spraying techniques may be employed to bond the heating element to the manifold. Further, a cartridge heater may be cast in the manifold, as disclosed in U.S. Pat. No. 4,439,915 to Gellert or a plate heater may be positioned adjacent the manifold to provide heat thereto, as disclosed in U.S. Pat. No. 6,447,283 to Gellert.

Figure 1:
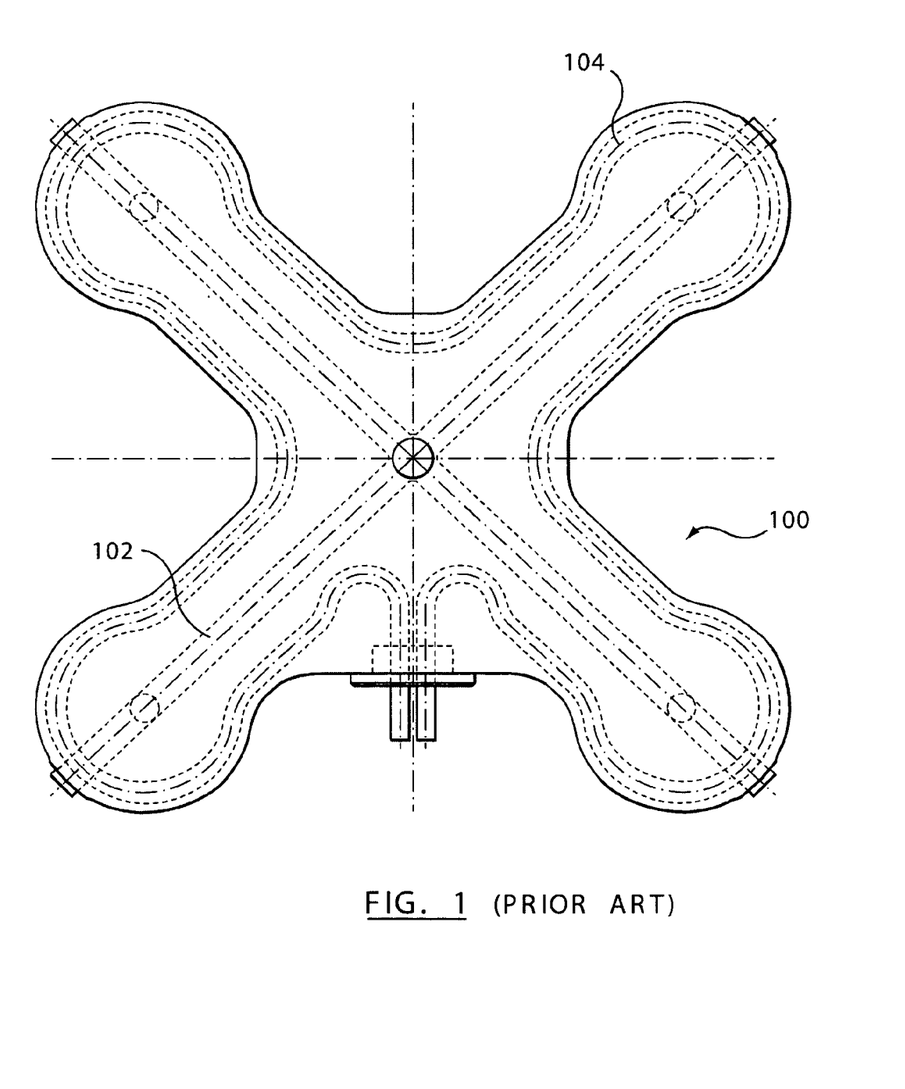
FIG. 1 is a top view of a prior art manifold.

Referring to FIG. 1, a typical prior art manifold is generally indicated at 100. The manifold 100 includes a manifold channel 102 and an integrated heating element 104. Heating of the manifold 100 by the heating element 104 is generally not uniform. None of the prior art manifold heating techniques provide an even heat distribution throughout the manifold. Hot spots occur at locations where the watt density is high and there is little or no contact with the surrounding mold plates. It is therefore desirable to remove heat from the manifold at these hot spot locations. As is clear from the layout of the heating element, the watt density varies from one manifold location to the next. Certain locations, near the nozzles for example, receive more heat because there is a greater length of heating element concentrated in those regions. Increasing the amount of heat generated at a particular manifold location by providing additional heating element length is generally not a practical solution. The heating element can only withstand a certain bend radius and must avoid connection points to other injection molding apparatus components such as the nozzles and the manifold backing plate. The hot/cold transition of the heating element, which is located near the entry and exit point of the heating element, is an example of a location where less heat is generated.

In an injection molding apparatus, contact between the manifold and the mold plates results in heat loss from the manifold. The location of cooling lines in the mold plates can influence the amount of heat loss from the manifold. Generally, the closer the cooling lines are to the manifold, the greater the heat loss from the manifold. Contact between the manifold and the nozzles may cause the manifold to either lose heat or gain heat depending on the particular application.

The temperature of the manifold is further influenced by the melt stream itself. For example, the temperature of the melt tends to be higher at locations where the melt experiences high shear stress, such as at bends in the manifold channel. Different types of melt will also influence the manifold temperature in different ways.

An uneven distribution of heat in the manifold causes the temperature of the melt entering the nozzles to vary slightly from one nozzle to the next. Any variation in the temperature of the melt entering each of the nozzles can adversely affect the quality of the molded products being produced by the injection molding process. With the increased use of more difficult to mold plastics materials, the melt must be maintained within narrower and narrower temperature ranges. If the temperature rises too high, degradation of the melt will result, and if the temperature drops too low, the melt will clog in the system and produce an unacceptable product. Both extremes can necessitate the injection molding apparatus being shut down and cleaned out, which can cause a very costly loss of production.

An uneven distribution of heat in the manifold has a further disadvantage in that the manifold is subjected to high stress due to continuous cycling between higher and lower temperatures. This can result in a shorter manifold life and increased downtime for the injection molding apparatus.

It is therefore an object of the present invention to provide a heat dissipation device for a manifold that obviates or mitigates at least one of the above disadvantages.

SUMMARY OF THE INVENTION

According to an aspect of the present invention there is provided an injection molding apparatus comprising:
 a hot runner manifold;
 a heater coupled to said manifold; and
 a heat dissipation device, having a first end coupled to said manifold between said manifold and a cooler member, said cooler member having a lower temperature than said manifold;
 wherein said heat dissipation device thermally expands and contacts said cooler member when a temperature of said manifold at said pre-determined location increases above a predetermined temperature.

According to another aspect of the present invention there is provided an injection molding apparatus comprising:
 a manifold;
 a heater coupled to said manifold; and
 a heat dissipation device coupled to said manifold, said heat dissipation device having a first orientation when said manifold has a temperature below a predetermined temperature and a second orientation when said manifold has a temperature greater than a predetermined temperature, wherein said first and second orientations differ in that said second orientation contacts an adjacent cooler member.

According to another aspect of the present invention there is provided a method of locally cooling a manifold of an injection molding apparatus comprising:

measuring the temperature of said manifold;

identifying high temperature locations on a surface of said manifold;

coupling a first end of a heat dissipation device to said surface of said manifold at said high temperature locations;

positioning a second end of said heat dissipation device such that thermal expansion causes said second end to come into contact with a cooler member when the temperature of said surface at said high temperature locations increases to a predetermined temperature; and heating said manifold surface to a temperature greater than said predetermined temperature.

According to another aspect of the present invention there is provided a heat dissipation device for use with a hot runner manifold apparatus, comprising:

a first end, thermally coupled with a hot runner manifold, a second end and one or more thermally conductive layers, wherein said second end of said heat dissipation device thermally expands and contacts a cooler portion of said manifold apparatus only at temperatures above a predetermined temperature.

According to another aspect of the present invention there is provided a method of dissipating heat from a manifold of an injection molding apparatus, comprising:

providing an injection molding apparatus including a manifold;

providing a manifold backing plate adjacent but not contacting said manifold;

providing at least one heat dissipation device having a first end and a second end;

coupling said first end to said manifold;

directing heat away from said manifold by allowing said heat dissipation device to thermally expand and contact said manifold backing plate when said manifold temperature increases beyond a predetermined temperature.

The present invention provides advantages in that the occurrence of hot spots in the manifold is reduced and the temperature distribution throughout the manifold is more even.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENTS

Figure 2:
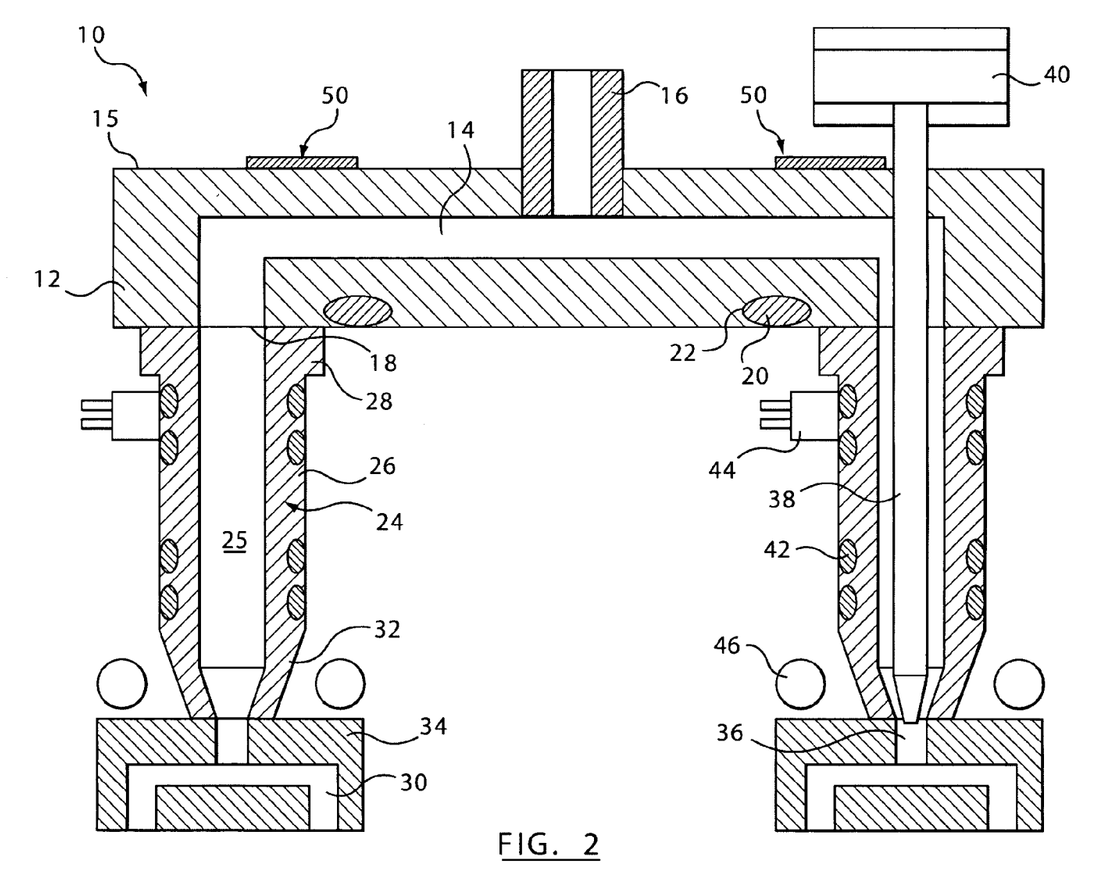
FIG. 2 is a side sectional view an injection molding apparatus in accordance with an embodiment of the present invention.

Referring now to FIG. 2, an injection molding apparatus is generally indicated by reference numeral 10. The injection molding apparatus 10 comprises a manifold 12 having a manifold channel 14 extending therethrough. A manifold bushing 16 is located at an inlet of the manifold channel 14 to receive a melt stream of moldable material from a machine nozzle (not shown) and to deliver the melt stream to manifold outlets 18. A heating element 20 is nested in a groove 22 that extends through the manifold 12 to maintain the melt stream at a desired temperature.

Nozzles 24 are located between the manifold 12 and respective mold cavities 30, which are formed in mold cavity plates 34. Each nozzle 24 includes a nozzle body 26 having a nozzle head 28 and a nozzle tip 32. A nozzle channel 25 extends through the nozzle 24 for delivering the melt stream from each manifold outlet 18 to the corresponding mold cavity 30.

Mold gates 36 are provided at the entrance to the mold cavities 30. The mold gates 36 are selectively openable to allow melt to be delivered to the mold cavities 30. The nozzles 24 may be thermal gated (shown on the left of FIG. 2) or valve gated (shown on the right of FIG. 2). The valve gated nozzles 24 include a valve pin 38 that is driven by a valve piston 40. Each valve pin 38 is selectively movable to open and close the respective mold gate 36.

Each nozzle 24 is further provided with a heater 42, which helps to maintain the melt stream at a desired temperature as it passes through the nozzle 24. The heater 42 is powered through an electrical connector 44 that is in communication with a power source (not shown). Cooling channels 46 are located adjacent the mold cavities 30 in order to cool the melt therein. Heat dissipation devices 50 are coupled to an upper surface 15 of the manifold 12 at the locations shown.

Figure 3:
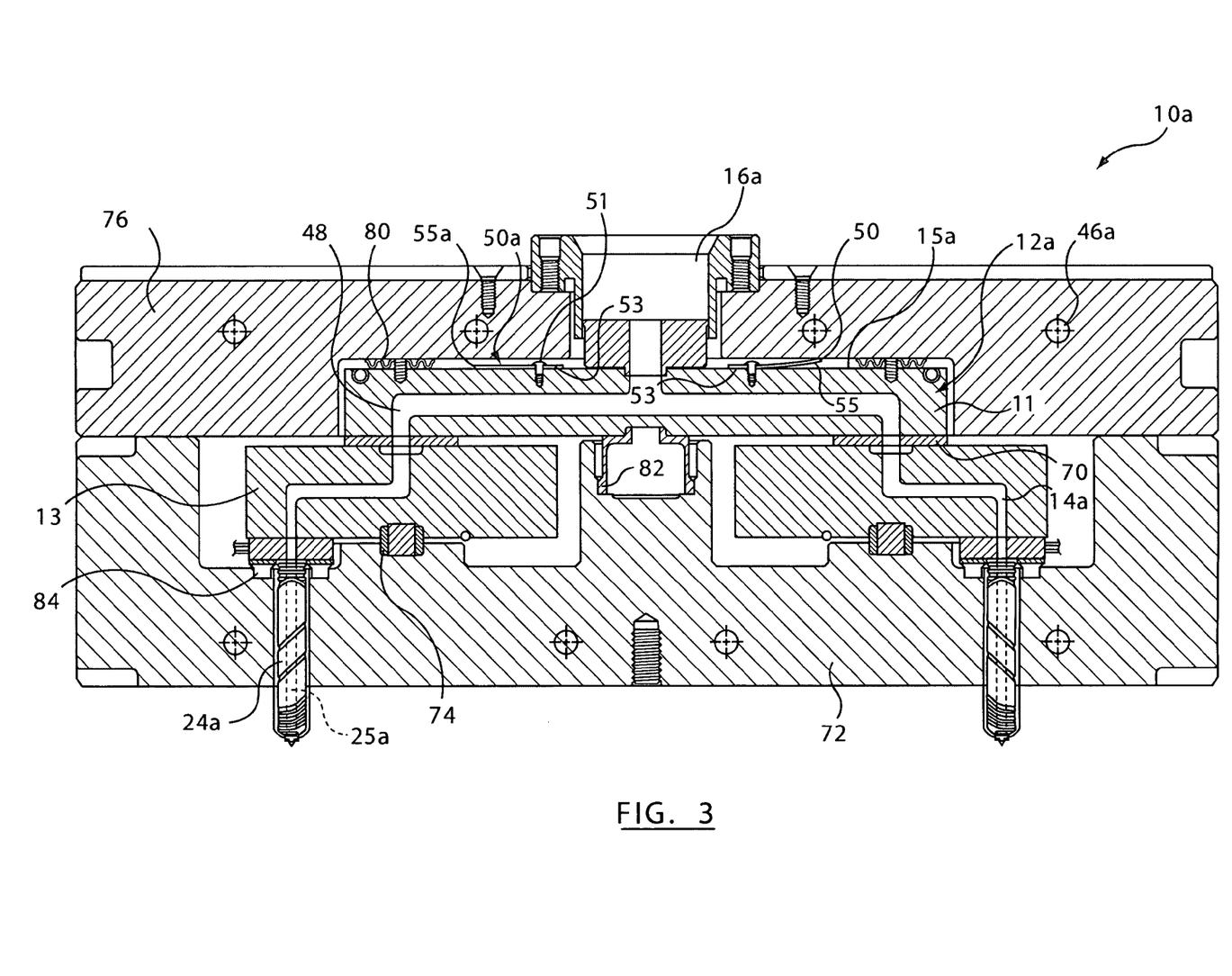
FIG. 3 is a side sectional view of injection molding apparatus in accordance with another embodiment of the present invention.

Another embodiment of an injection molding apparatus 10a is shown in FIG. 3. In this embodiment, the manifold is a bridging manifold 12a, which is comprised of a main manifold 11 and sub-manifolds 13. The main manifold 11 includes a main manifold channel 48 that is in communication with sub-manifold channels 14a of the sub-manifolds 13. A manifold bushing 16a is located at an inlet of the main manifold channel 48 to receive a melt stream of moldable material from a machine nozzle (not shown). The sub-manifolds 13 are coupled to the main manifold 11 by manifold melt links 70, which allow melt to flow from the main manifold channel 48 into the sub-manifold channels 14a. The sub-manifolds 13 are positioned in the injection molding apparatus 10a relative to mold plate 72 by sub-manifold locating rings 74. The main manifold 11 is separated from the manifold backing plate 76 by spacers 80 and located relative to the mold plate 72 by a main manifold locating ring 82. Cooling channels 46a extend through the mold plates 72 and 76.

Nozzles 24a are coupled to the sub-manifolds 13 by bolts 84. Each nozzle 24a includes a nozzle channel 25a that extends therethrough. The nozzles 24a are located between the sub-manifold 13 and respective mold cavities (not shown). In operation, the injection molding apparatus 10a is heated up from the cold condition, in which all of the components are at generally the same ambient temperature. The manifold 12a, which includes the main manifold 11 and the sub-manifolds 13, and the nozzle 24a are then maintained at their respective temperatures. Melt is injected from the machine nozzle into the manifold bushing 16a of the manifold 12a. The melt flows through the main manifold channel 48, through the manifold melt links 70, through the sub-manifold channels 14a and into the nozzle channels 25a and is injected into the mold cavities. The melt is then cooled in the mold cavities in order to produce finished molded parts.

Heat dissipation devices 50, similar to those shown in FIG. 2, are shown in FIG. 3. Heat dissipation devices 50 are secured at a first end 53 to the upper surface 15a of the main manifold 12a, such as by fasteners 51 or another method apparent to one skilled in the art, at one or more hot spots on manifold 12a. Hot spots are locations on the manifold 12a that reach a temperature that is above a desired, predetermined temperature during operation of the injection molding apparatus 10a. The hot spots are identified by methods that are well known in the art, such as simulation of an operating manifold using finite element analysis or measurement of the temperature of an operating manifold using an infrared camera.

Figure 4A:
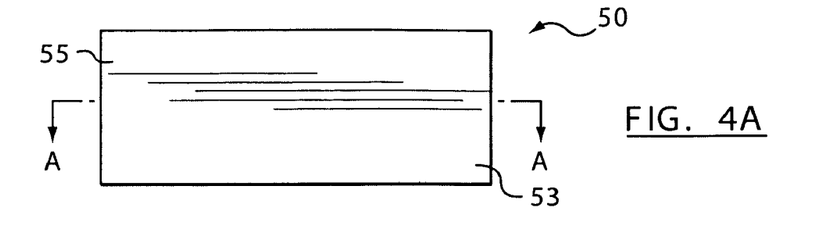
FIG. 4A is a top view of a heat dissipation device of the present invention.
Figure 4B:
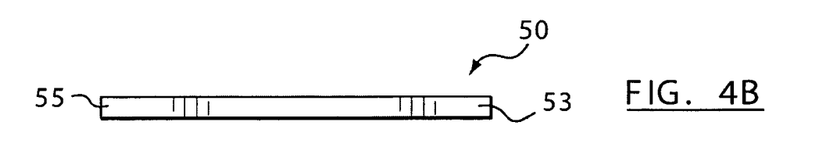
FIG. 4B is a cross-sectional view taken along line A—A of FIG. 4A.

As shown in FIG. 4A a heat dissipation device 50 is a generally rectangular plate. However, heat dissipation device 50 may be a plate that is shaped other than generally rectangular. For example, heat dissipation device 50 may be oval, arcuate shaped, or another polygonal or non-polygonal shape. FIG. 4B is a cross section taken along line A—A of FIG. 4A. As seen in FIG. 4B heat dissipation device 50 is made from a single piece of a highly thermally conductive material, with a high coefficient of thermal expansion. These materials may be copper, copper alloys, aluminum, and aluminum alloys.

Figure 4C:
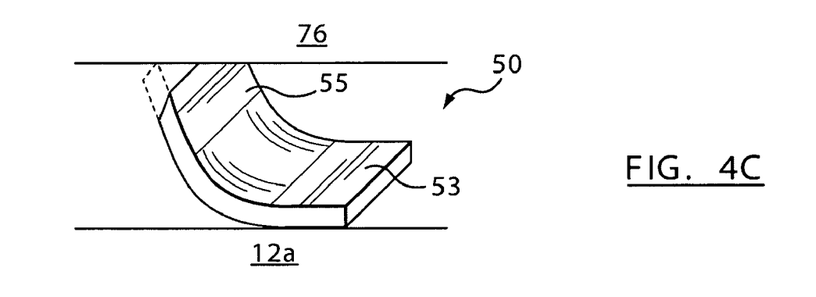
FIG. 4C is a perspective view of the heat dissipation device of FIG. 4A.

Preferably, heat dissipation device 50 has a second end 55 that is curved, as shown in FIG. 4C. Once positioned between a manifold backing plate 76 and a manifold 12, second end 55 is curved toward manifold backing plate 76 just enough that it is close to but does not contact manifold backing plate 76, when cool. As heat dissipation device 50 draws heat from manifold 12, heat dissipation device 50 begins to expand due to thermal expansion, as shown in shadow in FIG. 4C. Based on the coefficient of thermal expansion, one skilled in the art may select the correct material, size and length of heat dissipation device 50, such that it will expand to bring second end 55 into contact with manifold backing plate 76 when the temperature of manifold 12 reaches a desired temperature. Once second end 55 contacts the cold manifold backing plate 76, heat will be transferred to manifold backing plate 76 and away from the hot spot of manifold 12, cooling and lowering the temperature of manifold 12 at the location opposite first end 53 of heat dissipation device 50.

Once the temperature at the hot spot falls below the pre-determined temperature, heat dissipation device 50 will cool and shrink away from manifold backing plate 76. If the hot spot regenerates, heat dissipation device 50 will again thermally expand and the cycle will repeat, creating a temperature actuating heat dissipation device 50.

In another embodiment of the present invention, heat dissipation device 50 may require no contact to the manifold backing plate 76. Instead, the excessive heat at hot spots on manifold 12 can be transferred to the air between manifold backing plate 76 and manifold 12. However, second end 55 of heat dissipation device 50 must be positioned so that even with thermal expansion the second end 55 does not contact manifold backing plate 76.

Figure 5:
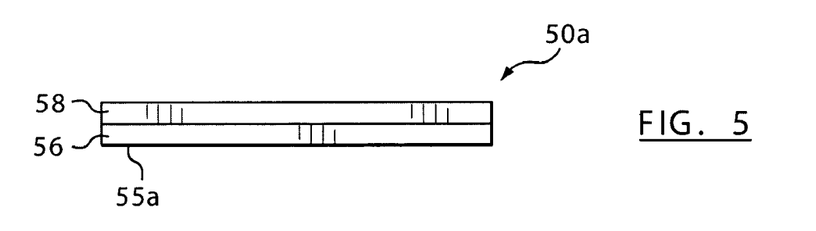
FIG. 5 is alternate cross-sectional view taken along line A—A of the heat dissipation device of FIG. 4A.

FIG. 5 shows an alternative cross section along line A—A of heat dissipation device 50 from FIG. 4A. In this case, heat dissipation device 50a of FIG. 5 includes a first layer 56, which contacts the upper surface 15a of manifold 12, and a second layer 58 adjacent to first lay 56. First layer 56 and second layer 58 are coupled to one another by brazing, welding, soldering or a high temperature adhesive. First layer 56 is comprised of a material having a high coefficient of expansion and second layer 58 is comprised of a material having a low coefficient of expansion.

Suitable materials for first layer 56 include copper, copper alloys, aluminum, and aluminum alloys. Suitable materials for second layer 58 include titanium, titanium alloys, stainless steels, iron alloys, ceramics and fiberglass. In a preferred embodiment, heat dissipation device 50a is bi-metallic with a copper or copper alloy first layer 56 and a nickel second layer 58. It will be appreciated by persons skilled in the art that any combination of materials can be used for heat dissipation device 50a, provided that first layer 56 has a higher coefficient of thermal expansion than second layer 58.

The thickness of both first and second layers 56, 58 is selected based on the desired thermal response characteristics for a particular application. The thickness of the layers 56, 58 is generally in the range of 0.01 inches to 0.125 inches.

Heat dissipation device 50a need not be initially curved like heat dissipation device 50 of FIG. 4C. Instead, heat dissipation device 50a moves between a generally flat position, shown at 50a in FIG. 3, in which the heat dissipation device 50a lies against upper surface 15a of manifold 12, and a curved position, similar to that shown at 50 in FIG. 3, in which a second end 55a of heat dissipation device 50a curves away from manifold 12. As injection molding apparatus 10a is heated up from a cold condition, the temperature of manifold 12 increases, particularly at the previously identified hot spots, and first layer 56 and second layer 58 of heat dissipation device 50a expand due to thermal expansion. However, second layer 58 expands at a slower rate than first layer 56. The difference in rates of expansion between first layer 56 and second layer 58, makes heat dissipation device 50a curl.

As it curls, second end 55a of heat dissipation device 50a curves away from manifold upper surface 15a. When the temperature of the hot spots has increased beyond a pre-determined value, the curved heat dissipation device 50a contacts manifold backing plate 76. Heat is then transferred from manifold 12 to manifold backing plate 76 via heat dissipation device 50a. The temperature at the hot spots reduces in response to the heat lost to manifold backing plate 76. As the temperature reduces, first layer 56 and second layer 58 shrink, also at different rates. Once the temperature falls below a pre-determined temperature, second end 55 shrinks enough to lose contact with manifold backing plate 76, and heat dissipation device 50a falls back to a generally flat position. The heat dissipation device 50a cycles between a generally flat position and a curved position to regulate the temperature of manifold hot spots.

Figure 6:
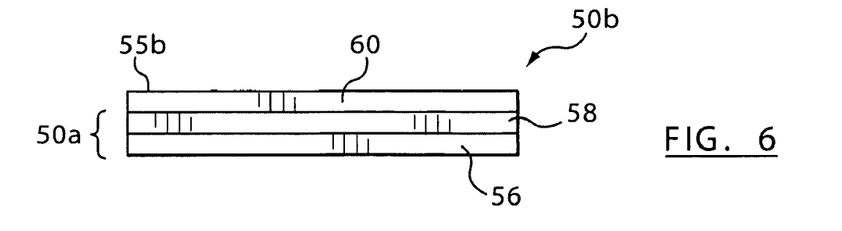
FIG. 6 is an alternate cross-sectional view taken along line A—A of the heat dissipation device of FIG. 4A.

FIG. 6 shows an alternative cross section along line A—A of heat dissipation device 50 from FIG. 4A. In this case, heat dissipation device 50b includes an outer layer 60 located adjacent second layer 58 of heat dissipation device 50a of FIG. 5. Outer layer 60 is secured to second layer 58 by brazing, soldering, welding or a high temperature adhesive. Outer layer 60 is generally thinner than heat dissipation device 50a so as not to hinder the curving motion discussed above created by the thermal expansion rate difference between first layer 56 and second layer 58. Outer layer 60 is comprised of a material having a high rate of thermal conductivity. Suitable outer layer 60 materials include copper, copper alloys, aluminum, and aluminum alloys. Outer layer 60 and first layer 56 may be the same material. Outer layer 60 may, alternatively, be a material completely separate from heat dissipation device 50a.

In operation, heat dissipation device 50b operates as previously described for heat dissipation device 50a. As heat dissipation device 50a moves away from upper surface 15a of manifold 12, outer layer 60 moves with it. Both heat dissipation device 50a and outer layer 60 continue to curve away from manifold 12 until second end 55b of outer layer 60 contacts manifold backing plate 76. When in contact, second layer 58 acts as insulation between first layer 56 and outer layer 60, thus operating as a damper so that heat loss from manifold 12 via heat dissipation device 50b is gradual. This ensures that heat dissipation device 50b does not oscillate too rapidly between the curved and generally flat positions.

Figure 7A:
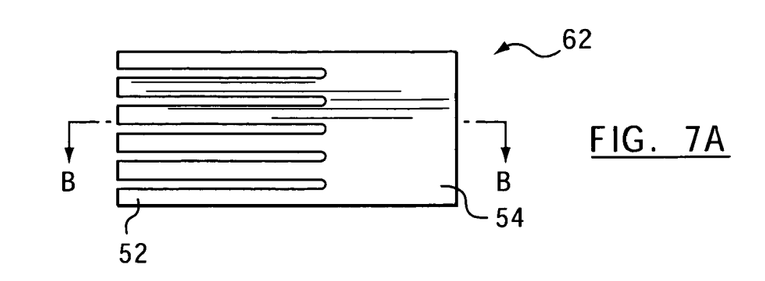
FIG. 7A is a top view of an alternate heat dissipation device of the present invention.
Figure 7B:
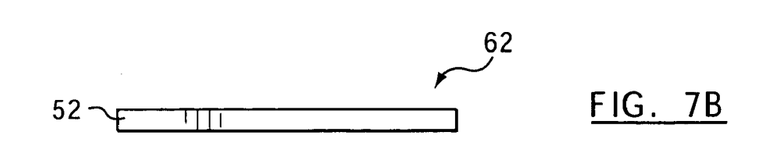
FIG. 7B is a cross-sectional view taken along line B—B of FIG. 7A.

Referring to FIG. 7A, another embodiment of a heat dissipation device 62 is shown. The construction and operation of heat dissipation device 62 is similar to that of heat dissipation device 50. However, instead of being a generally rectangular plate, heat dissipation device 62 includes a plurality of fins 52 extending from a base 54. FIG. 7B is a cross section taken along line B—B of FIG. 7A. As seen in FIG. 7B, heat dissipation device 62 is made from a single piece of a highly thermally conductive material, with a high coefficient of thermal expansion. These materials may be copper, copper alloys, aluminum, and aluminum alloys.

Figure 7C:
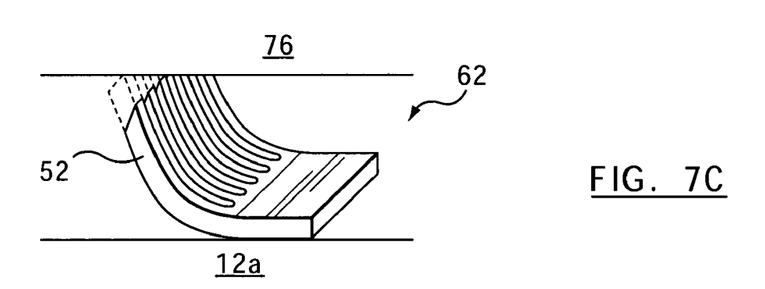
FIG. 7C is a perspective view of the heat dissipation device of FIG. 7A.

Heat dissipation device 62 operates identically to heat dissipation device 50. Fins 52 of heat dissipation device 62 are curved, as shown in FIG. 7C and positioned so that fins 52 are close to but do not contact manifold backing plate 76, when cool. When heated, thermal expansion causes fins 52 to expand to contact manifold backing plate 76, as shown in shadow in FIG. 7C. When enough heat has transferred from manifold 12 to manifold backing plate 76 to reduce the temperature of manifold 12, heat dissipation device 62 has cooled enough that fins 52 shrink away from manifold backing plate 76. The distance that the fins 52 move can be controlled based on selection of materials and selection of a fin length.

Similar to heat dissipation device 50, it may be desirable to dissipate heat from the manifold 12 without heat dissipation device 62 having direct contact with manifold backing plate 76. In this case, particular characteristic of the material and fin length are selected so that the fins 52 do not contact manifold backing plate 76 even with thermal expansion. In this case, more heat will be dissipated from heat dissipation device 62 than heat dissipation device 50 due to the increased surface area created by fins 52 of heat dissipation device 62.

Figure 8:
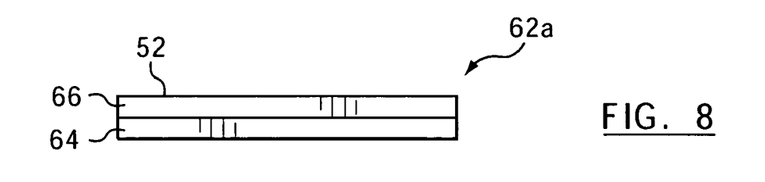
FIG. 8 is alternate cross-sectional view taken along line B—B of the heat dissipation device of FIG. 7A.

FIG. 8 shows an alternative cross section along line B—B of heat dissipation device 62 from FIG. 7A. In this case, heat dissipation device 62a of FIG. 8 includes a first layer 64, which contacts upper surface 15a of manifold 12, and a second layer 66 adjacent to first layer 64. First layer 64 is comprised of a material having a higher coefficient of expansion than the material of second layer 65. Heat dissipation device 62a of FIG. 8 operates in the same manner as heat dissipation device 50a of FIG. 5. Fins 52 curl away from manifold 12 due to the difference in thermal expansion rates of first and second layers 64, 66 until fins 52 contact manifold backing plate 76 at a predetermined temperature. When the temperature of manifold 12 falls to below the predetermined temperature, the fins uncurl and move back towards a relatively flat position. The cycle continues as the temperature of manifold 12 fluctuates above and below the predetermined temperature.

Figure 9:
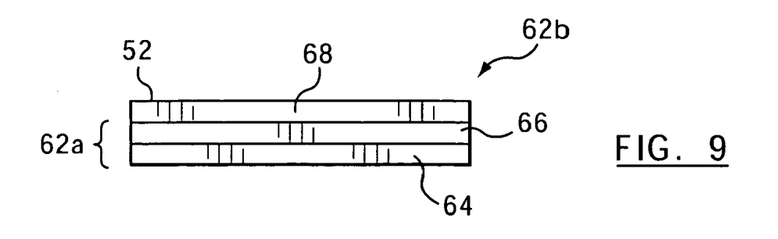
FIG. 9 is an alternate cross-sectional view taken along line B—B of the heat dissipation device of FIG. 7A.

FIG. 9 shows an alternative cross section along line B—B of heat dissipation device 62 from FIG. 7A. In this case, heat dissipation device 62b includes an outer layer 68 located adjacent second layer 66 of heat dissipation device 62a of FIG. 8. Outer layer 68 operates identically to outer layer 60 of heat dissipation device 50b. As heat dissipation device 62a curls due to the different thermal expansion rates of first and second layers 64, 66, outer layer 68 contacts manifold backing plate 76. Thus, second layer 66 acts as insulation between the higher thermal conductive materials of first layer 64 and outer layer 68. In another embodiment, fins 52 of outer layer 68, may be corrugated.

Because each heat dissipation device operates independently and is heat-actuating, a heat dissipation device is useful for regulating hot spots of any temperature based on the particular selection of materials and construction. Further, several heat dissipation devices may be used at different locations on manifold 12 to regulate the temperature of different hot spots. For example, if one hot spot is at a higher temperature than another, a heat dissipation device at that spot will curve away from the surface more quickly to contact manifold backing plate 76 and remain in contact with the manifold backing plate 76 for a longer period of time than a heat dissipation device positioned adjacent a lower temperature hot spot, which will dissipate a larger amount of heat from the higher temperature spot. The heat-actuating behavior of a heat dissipation device of the present invention allows it to perform differently in response to each hot spot.

It will be appreciated that any heat dissipation device of the present invention may be sized to cover any area on manifold 12. In addition, a heat dissipation device is not limited to being coupled to upper surface 15a of manifold 12. A heat dissipation device may be coupled to manifold 12 at any location where it is desirable to dissipate heat. In a bridging manifold, such as that of FIG. 3, a heat dissipation device of the present invention may be coupled to the main manifold 11, the sub-manifolds 13, or both. A heat dissipation device may further be coupled to any location in an injection molding apparatus where local heat dissipation is desired. It will further be appreciated by a person skilled in the art that a heat dissipation device may be used with any type of manifold that is heated by any type of manifold heating arrangement.

The many features and advantages of the invention are apparent from the detailed specification and, thus, it is intended by the appended claims to cover all such features and advantages of the invention that fall within the true spirit and scope of the invention. Further, since numerous modifications and changes will be readily apparent to one skilled in the art, it is not desired to limit the invention to the exact construction and operation illustrated and described by the text, figures or claims herein, and all suitable modifications and equivalents are to be considered to fall within the scope of the invention.

I claim:

1. An injection molding apparatus comprising:
   a hot runner manifold;
   a heater coupled to said manifold; and a heat dissipation device, having a first end coupled to said manifold between said manifold and a cooler member, said cooler member having a lower temperature than said manifold;
wherein said heat dissipation device thermally expands and contacts said cooler member when a temperature of said manifold at said pre-determined location increases above a predetermined temperature.

2. The injection molding apparatus as claimed in claim 1, wherein said heat dissipation device comprises a plurality of fins extending from a base.

3. The injection molding apparatus as claimed in claim 1, wherein said heat dissipation device has a second end, said second end being bent towards said cooler member prior to the introduction of heat into said manifold.

4. The injection molding apparatus as claimed in claim 3, wherein said heat dissipation device includes only a single layer of material.

5. The injection molding apparatus as claimed in claim 4, wherein said single layer is selected from the group consisting of copper, copper alloys, aluminum, and aluminum alloys.

6. The injection molding apparatus as claimed in claim 1, wherein said heat dissipation device includes a first layer that is directed toward a surface of said manifold and an opposed second layer.

7. The injection molding apparatus as claimed in claim 6, wherein said first layer is more thermally conductive than said opposed second layer.

8. The injection molding apparatus as claimed in claim 7, wherein said first layer is selected from the group consisting of copper, copper alloys, aluminum, and aluminum alloys.

9. The injection molding apparatus as claimed in claim 7, wherein said second layer is selected from the group consisting of titanium, titanium alloys, stainless steels, iron alloys, ceramic and fiberglass.

10. The injection molding apparatus as claimed in claim 6, wherein said first layer and said second layer are metallic.

11. The injection molding apparatus as claimed in claim 6, wherein said heat dissipation device includes a third layer adjacent to said second layer and opposite said second layer from said first layer.

12. The injection molding apparatus as claimed in claim 11, wherein said first and third layers are materials having a higher coefficient of thermal expansion than said second layer.

13. The injection molding apparatus as claimed in claim 1, wherein said cooler member is a manifold backing plate.

14. The injection molding apparatus as claimed in claim 1, further comprising a plurality of heat dissipation devices having a first end coupled to said manifold.

15. An injection molding apparatus, comprising:
a manifold;
a heater coupled to said manifold; and
a heat dissipation device coupled to said manifold, said heat dissipation device having a first spacial orientation when said manifold has a temperature below a predetermined temperature and a second spacial orientation when said manifold has a temperature greater than a predetermined temperature, wherein said first and second orientations differ in that said second orientation contacts an adjacent cooler member.

16. The injection molding apparatus as claimed in claim 15, wherein said heat dissipation device is bent toward said cooler member prior to introducing heat to said manifold.

17. The injection molding apparatus as claimed in claim 15, wherein said cooler member is a manifold backing plate.

18. The injection molding apparatus as claimed in claim 15, wherein said heat dissipation device comprises a first layer and a second layer, wherein said first layer is closer to said manifold than said second layer and said first layer is a material having a greater coefficient of thermal expansion than said second layer.

19. An injection molding apparatus as claimed in claim 15, wherein said heat dissipation device includes a plurality of fin portions extending from a band portion.

20. A method of locally cooling a manifold of an injection molding apparatus comprising:
measuring the temperature of said manifold;
identifying high temperature locations on a surface of said manifold;
coupling a first end of a heat dissipation device to said surface of said manifold at said high temperature locations;
positioning a second end of said heat dissipation device such that thermal expansion causes said second end to come into contact with a cooler member when the temperature of said surface at said high temperature locations increases to a predetermined temperature; and
heating said manifold surface to a temperature greater than said predetermined temperature.

21. The method of claim 20, further comprising bending said second end away from said manifold surface and towards said cooler member.

22. The method of claim 20, wherein said cooler member is a manifold backing plate.

23. A heat dissipation device for use with a hot runner manifold apparatus, comprising:
a first end thermally coupled with a hot runner manifold, a second end and one or more thermally conductive layers,
wherein said second end of said heat dissipation device thermally expands and contacts a cooler portion of said manifold apparatus only at temperatures above a predetermined temperature.

24. A heat dissipation device as claimed in claim 23, wherein said second end of said heat dissipation device is bent away from said manifold.

25. A heat dissipation device as claimed in claim 23, further comprising a first layer directed towards an outer surface of said manifold and a second layer adjacent to said first layer, wherein said first layer has a greater coefficient of thermal expansion than said second layer.

26. A heat dissipation device as claimed in claim 25, further comprising a third layer adjacent said second layer and opposite said second layer from said first layer, wherein said third layer has a greater coefficient of thermal expansion than said second layer.

27. A method of dissipating heat from a manifold of an injection molding apparatus, comprising:
providing an injection molding apparatus including a manifold;
providing a manifold backing plate adjacent but not contacting said manifold;
providing at least one heat dissipation device having a first end and a second end;
coupling said first end to said manifold;
directing heat away from said manifold by allowing said heat dissipation device to thermally expand and contact said manifold backing plate when said manifold temperature increases beyond a predetermined temperature.

28. A method of dissipating heat from a manifold as claimed in claim 27, further comprising bending said heat dissipation device away from said manifold and towards said manifold backing plate.

29. A method of dissipating heat from a manifold as claimed in claim 27, wherein said heat dissipation device comprises a first layer directed towards an outer surface of said manifold and a second layer adjacent to said first layer, said first layer having a greater coefficient of thermal expansion than said second layer.

* * * * *